US012614737B2

(12) United States Patent
Shibata et al.

(10) Patent No.: US 12,614,737 B2
(45) Date of Patent: Apr. 28, 2026

(54) FUEL CELL STACK

(71) Applicant: TOYOTA JIDOSHA KABUSHIKI KAISHA, Toyota (JP)

(72) Inventors: Kazunori Shibata, Mishima (JP); Hitoshi Hamada, Gotemba (JP); Takashi Kajiwara, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 550 days.

(21) Appl. No.: 18/183,536

(22) Filed: Mar. 14, 2023

(65) Prior Publication Data

US 2023/0369613 A1     Nov. 16, 2023

(30) Foreign Application Priority Data

May 11, 2022     (JP) ................................. 2022-077954

(51) Int. Cl.
*H01M 8/0247*     (2016.01)
*H01M 8/0276*     (2016.01)
*H01M 8/2465*     (2016.01)

(52) U.S. Cl.
CPC ....... *H01M 8/0247* (2013.01); *H01M 8/0276* (2013.01); *H01M 8/2465* (2013.01)

(58) Field of Classification Search
None
See application file for complete search history.

(56) References Cited

U.S. PATENT DOCUMENTS

| | | | |
|---|---|---|---|
| 2008/0248357 A1 | 10/2008 | Terada et al. | |
| 2009/0197147 A1* | 8/2009 | Fly ........................ | H01M 8/242 |
| | | | 277/650 |
| 2009/0280391 A1 | 11/2009 | Chang et al. | |
| 2015/0372321 A1* | 12/2015 | Araki .................. | H01M 8/1004 |
| | | | 429/483 |
| 2018/0358634 A1* | 12/2018 | Sekine ................ | H01M 8/0254 |
| 2023/0317978 A1* | 10/2023 | Yui ........................ | H01M 8/021 |
| | | | 429/510 |

FOREIGN PATENT DOCUMENTS

| | | |
|---|---|---|
| JP | 2004311254 A | 11/2004 |
| JP | 2008004278 A | 1/2008 |
| JP | 2009272287 A | 11/2009 |

* cited by examiner

*Primary Examiner* — Alix E Eggerding
(74) *Attorney, Agent, or Firm* — Hunton Andrews Kurth LLP

(57)     ABSTRACT

A fuel cell stack includes a cell stack in which a plurality of unit cells each including a pair of separators is stacked together. The fuel cell stack includes a seal sheet configured to seal between adjacent unit cells. The pair of separators each include a seal line rib on a seal sheet side of the separator, the seal line rib serving as a seal line with the seal sheet. Among two facing separators that are a first facing separator and a second facing separator facing each other while sandwiching the seal sheet between the adjacent unit cells, the first facing separator includes a protruding portion on at least one part of the seal line rib, and the second facing separator includes a recessed portion in the seal line rib that is configured to fit the protruding portion.

10 Claims, 2 Drawing Sheets

FIG. 1
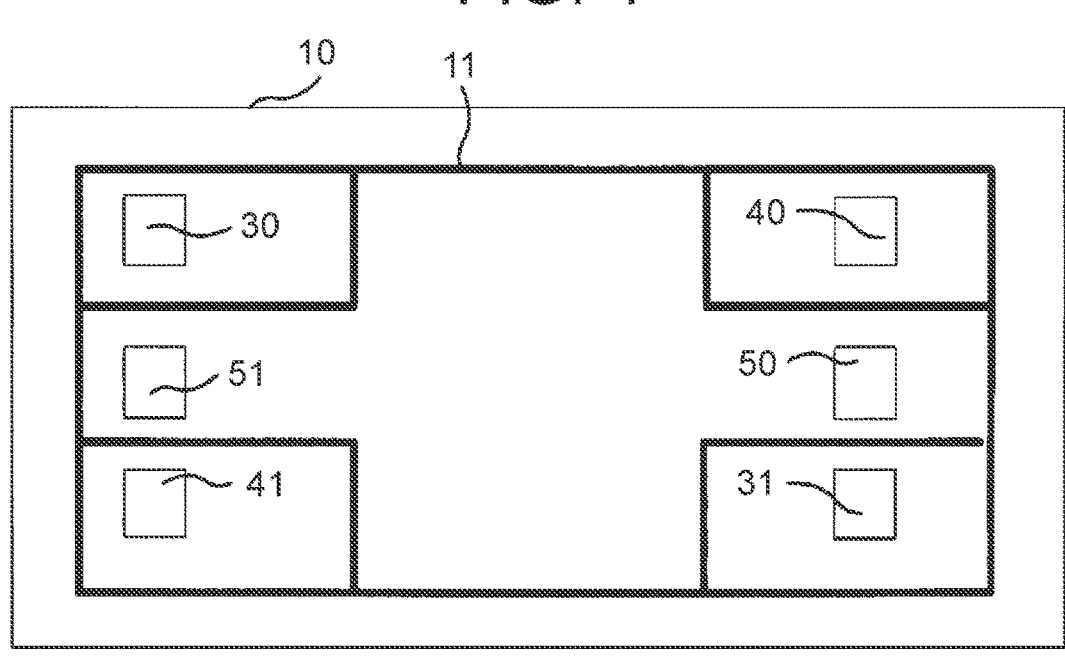
FIG. 2
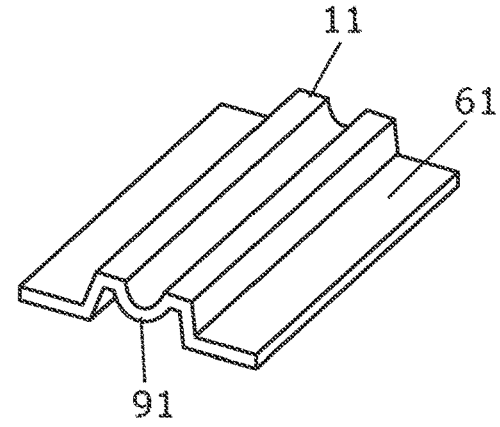
FIG. 3

FUEL CELL STACK

CROSS-REFERENCE TO RELATED APPLICATION

This application claims priority to Japanese Patent Application No. 2022-077954 filed on May 11, 2022, incorporated herein by reference in its entirety.

BACKGROUND

1. Technical Field

The present disclosure relates to a fuel cell stack.

2. Description of Related Art

Various studies have been made on fuel cells. For example, Japanese Unexamined Patent Application Publication No. 2008-004278 (JP 2008-004278 A) discloses a fuel cell seal and a fuel cell that reduce fuel leakage. For example, Japanese Unexamined Patent Application Publication No. 2004-311254 (JP 2004-311254 A) discloses a fuel cell that is formed by stacking together a plurality of unit cells of the fuel cell or the like. In the fuel cell, it is possible to suppress leakage of gas between a separator and an electrolyte membrane and a highly airtight sealing action is obtained even with a low fastening force. In addition, the fuel cell is capable of generating power that is higher than that in a related art, and has long-life battery characteristic.

SUMMARY

In the related art, since a fitting structure is made of an elastic sealing material such as a rubber material, the fitting structure is not sufficiently stable, which causes misalignment.

In a seal material having elasticity such as a rubber material, it is necessary to perform sealing by compressing and deforming the seal part when exhibiting the seal function. Thus, the fitting structure deforms and does not function. In a seal sheet such as an adhesive seal, the seal structure can be maintained without changing the recessed-protruding structure of the seal sheet by providing the seal sheet side with an elastic function. However, when the fastening load is increased excessively during sealing, there are cases where the seal line rib structure on the cell side is plastically deformed. Thus, it is necessary to apply an appropriate high load to the seal line without causing plastic deformation with a low load.

The present disclosure provides a fuel cell stack capable of ensuring good gas sealing properties between adjacent unit cells.

In one aspect of the present disclosure, a fuel cell stack is provided. This fuel cell stack includes a cell stack in which a plurality of unit cells each including a pair of separators is stacked together. The fuel cell stack includes a seal sheet configured to seal between the unit cells that are adjacent to each other.

The pair of separators each include a seal line rib on a seal sheet side of the separator, the seal line rib serving as a seal line with the seal sheet.

Among two facing separators that are a first facing separator and a second facing separator facing each other while sandwiching the seal sheet between the unit cells that are adjacent to each other, the first facing separator that is one of the two facing separators includes a protruding portion on at least one part of the seal line rib, and the second facing separator that is another one of the two facing separators includes a recessed portion in the seal line rib that is configured to fit the protruding portion.

In the fuel cell stack of the aspect described above, the seal sheet may be an adhesive sheet.

In the fuel cell stack of the aspect described above, the second facing separator may have a linear recessed portion in the seal line rib along the seal line of the seal line rib.

In the fuel cell stack of the aspect described above, the second facing separator may have a plurality of circular or spherical recessed portions on the seal line rib.

The fuel cell stack of the present disclosure can ensure good gas sealing properties between adjacent unit cells.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic plan view showing an example of a fuel cell stack of the present disclosure;

FIG. 2 is a schematic cross-sectional view showing an example of a first facing separator and a second facing separator facing and sandwiching a seal sheet in a seal line between adjacent unit cells of the fuel cell stack of the present disclosure;

FIG. 3 is a schematic perspective view showing an example of a recessed portion of the second facing separator.

DETAILED DESCRIPTION OF EMBODIMENTS

Figure 4:
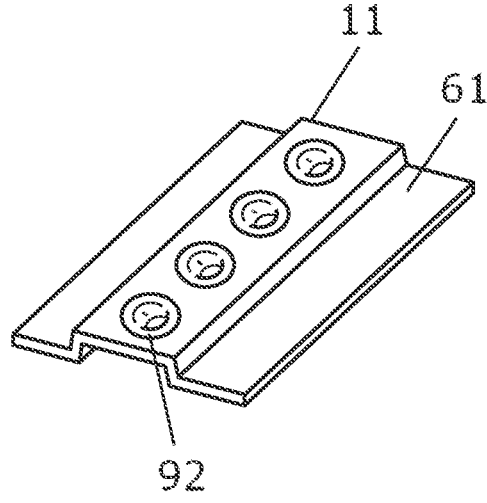
FIG. 4 is a schematic perspective view showing an example of the recessed portion of the second facing separator.

Embodiments according to the present disclosure will be described below. Matters other than those specifically mentioned in this specification that are necessary for the practice of the present disclosure (for example, the general configuration and manufacturing process of a fuel cell stack that does not characterize the present disclosure) can be grasped as a design matter of a person skilled in the art based on the related art in the field. The present disclosure can be implemented based on the content disclosed in this specification and common general technical knowledge in the field.

In addition, the dimensional relationships (length, width, thickness, etc.) in the drawings do not reflect the actual dimensional relationships.

In the present specification, the term "to" such as in "A to B" indicating a numerical range is used in the sense of including the numerical values described before and after the term as a lower limit and an upper limit.

Any combination of the upper and lower limits in the numerical range can be adopted.

In the present disclosure, provided is a fuel cell stack characterized in that the fuel cell stack includes a cell stack in which a plurality of unit cells each including a pair of separators is stacked together. The fuel cell stack includes a seal sheet configured to seal between adjacent unit cells.

The pair of separators each have a seal line rib on the seal sheet side, the seal line rib serving as a seal line with the seal sheet.

Among two facing separators that are a first facing separator and a second facing separator that face each other while sandwiching the seal sheet between the adjacent unit cells, the first facing separator that is one of the two facing separators includes a protruding portion on at least one part of the seal line rib, and the second facing separator that is the other one of the two facing separators includes a recessed portion in the seal line rib that is configured to fit the protruding portion.

According to the present disclosure, the seal line can be lengthened and the sealing performance can be improved. Moreover, according to the present disclosure, the positioning of the seal line is facilitated, and the productivity of the fuel cell stack can be improved.

In the present disclosure, fuel gas and oxidant gas are collectively referred to as reactant gas. The reactant gas supplied to the anode is fuel gas, and the reactant gas supplied to the cathode is oxidant gas. The fuel gas is a gas containing primarily hydrogen and may be hydrogen. The oxidant gas is a gas containing oxygen, and may be oxygen, air, dry air, or the like.

The fuel cell stack of the present disclosure includes the cell stack in which the plurality of unit cells including the pair of separators is stacked together and uses the seal sheet for sealing between the adjacent unit cells.

In the present disclosure, both the unit cell and the fuel cell stack in which unit cells are stacked together may be referred to as the fuel cell.

A cell stack is a stack obtained by stacking the plurality of unit cells together. The number of unit cells stacked in the cell stack is not particularly limited, and may be from two to several hundred.

A fastening load may be applied to the cell stack by a fastening member.

Examples of fastening members include shaft members such as bolts and nuts with threads on both ends, and spring members.

The fuel cell stack may have a pair of end plates at both ends in a stacking direction of the cell stack.

Examples of fastening the cell stack include a method of applying a fastening load by thread fastening via a pair of end plates arranged at both ends of the cell stack in the stacking direction, by using shaft members such as bolts and nuts with threads on both ends, and a method of applying a fastening load by using a spring member and the like.

A unit cell of a fuel cell typically includes a membrane electrode gas diffusion layer assembly (MEGA).

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes a cathode catalyst layer and a cathode-side gas diffusion layer.

The anode (fuel electrode) includes an anode catalyst layer and an anode-side gas diffusion layer.

The cathode catalyst layer and the anode catalyst layer are collectively referred to as catalyst layers.

The catalyst layer may include, for example, a catalyst metal that promotes an electrochemical reaction, an electrolyte with proton conductivity, a support with electron conductivity, and the like.

As the catalyst metal, for example, platinum (Pt), an alloy composed of Pt and other metal (for example, a Pt alloy mixed with cobalt, nickel, etc.), or the like can be used.

The electrolyte may be fluorine-based resin or the like. As the fluorine-based resin, for example, Nafion solution or the like may be used.

The catalyst metal is supported on a carrier, and each catalyst layer may contain a mixture of a carrier supporting the catalyst metal (catalyst-supporting carrier) and an electrolyte. Examples of the carrier for supporting the catalyst metal include commercially available carbon materials such as carbon.

The cathode-side gas diffusion layer and the anode-side gas diffusion layer are collectively referred to as gas diffusion layers.

The gas diffusion layer may be an electroconductive member or the like having gas permeability.

Examples of the electroconductive member include porous carbon bodies such as carbon cloth and carbon paper, and porous metal bodies such as metal mesh and metal foam.

The electrolyte membrane may be a solid polymer electrolyte membrane. Examples of solid polymer electrolyte membranes include fluorine-based electrolyte membranes such as perfluorosulfonic acid thin films containing moisture, and hydrocarbon-based electrolyte membranes. As the electrolyte membrane, for example, a Nafion membrane (manufactured by DuPont) may be used.

A unit cell may typically have a resin frame.

The resin frame is disposed around the periphery of the membrane electrode gas diffusion layer assembly and between the cathode separator and the anode separator.

The resin frame may have a framework portion, an opening portion, and a hole.

The framework portion is the main part of the resin frame that connects with the membrane electrode gas diffusion layer assembly.

The opening portion is a holding area for the membrane electrode gas diffusion layer assembly, and is an area extending through a part of the framework portion for housing the membrane electrode gas diffusion layer assembly. The opening portion may be disposed in the resin frame at a position where the framework portion is positioned around (in the periphery of) the membrane electrode gas diffusion layer assembly, and may be provided in the center of the resin frame.

The holes in the resin frame allow fluids such as reactant gas and a coolant to flow in the stacking direction of the unit cells. The holes in the resin frame may be aligned and arranged to communicate with the holes in the separator.

The resin frame may include a frame-shaped core layer and two frame-shaped shell layers provided on both sides of the core layer, that is, a first shell layer and a second shell layer. The first shell layer and the second shell layer may be provided in a frame shape on both sides of the core layer, similarly to the core layer.

The core layer may be a structural member having gas sealing properties and insulating properties, and may be made of a material having a structure that does not change under temperature conditions during thermocompression bonding in a manufacturing process of the fuel cell. Specifically, materials for the core layer include, for example, resin such as polyethylene, polypropylene, PC (polycarbonate), PPS (polyphenylene sulfide), PET (polyethylene terephthalate), PEN (polyethylene naphthalate), PA (polyamide), PI (polyimide), PS (polystyrene), PPE (polyphenylene ether), PEEK (polyetheretherketone), cycloolefin, PES (polyethersulfone), PPSU (polyphenylsulfone), LCP (liquid crystal polymer), epoxy resin, etc. The material of the core layer may be a rubber material such as EPDM (ethylene propylene diene rubber), fluororubber, or silicone rubber.

The thickness of the core layer may be 5 μm or more, or may be 20 μm or more, from the viewpoint of ensuring insulation, and may be 200 μm or less, or may be 150 μm or less, from the viewpoint of reducing the cell thickness.

The first shell layer and the second shell layer may have a high adherence property to other materials, have a property of softening under a temperature condition during thermo-compression bonding and having a lower viscosity and melting point than the core layer, in order to adhere the core layer with the anode separator and the cathode separator and ensure a sealing performance. Specifically, the first shell layer and the second shell layer may be a thermoplastic resin such as a polyester-based thermoplastic resin and a modified olefin-based thermoplastic resin, or may be a thermosetting resin that is a modified epoxy resin.

The resin that constitutes the first shell layer and the resin that constitutes the second shell layer may be the same type of resin or different types of resin. By providing the shell layers on both sides of the core layer, it becomes easier to adhere the resin frame and the two separators by hot pressing.

The thickness of each of the first shell layer and the second shell layer may be 5 μm or more, or may be 30 μm or more, from the viewpoint of ensuring adhesiveness, and may be 100 μm or less, or may be 40 μm or less, from the viewpoint of reducing the cell thickness.

In the resin frame, the first shell layer and the second shell layer may be provided only on the portions to be adhered to the anode separator and the cathode separator, respectively. The first shell layer provided on one side of the core layer may be adhered to the cathode separator. The second shell layer provided on the other side of the core layer may be adhered to the anode separator. Then, the resin frame may be sandwiched between the pair of separators.

A unit cell includes a pair of separators.

The pair of separators sandwiches the resin frame and the membrane electrode gas diffusion layer assembly.

In the pair of separators, one is an anode separator and the other is a cathode separator. In this disclosure, the anode separator and the cathode separator are collectively referred to as separators.

The separators may have holes such as a supply hole and a discharge hole for circulating a fluid such as reactant gas and a coolant in the stacking direction of the unit cells. As the coolant, for example, a mixed solution of ethylene glycol and water can be used to suppress freezing at low temperatures.

Examples of the supply hole include a fuel gas supply hole, an oxidant gas supply hole, a coolant supply hole, and the like.

Examples of the discharge hole include a fuel gas discharge hole, an oxidant gas discharge hole, a coolant discharge hole, and the like.

The separator may have a reactant gas channel on the surface in contact with the gas diffusion layer. Moreover, the separator may have a coolant channel for keeping the temperature of the fuel cell constant on the surface opposite to the surface in contact with the gas diffusion layer.

The anode separator may have a fuel gas channel on the surface in contact with the anode-side gas diffusion layer. In addition, the anode separator may have a coolant channel for keeping the temperature of the fuel cell constant on the surface opposite to the surface in contact with the anode-side gas diffusion layer.

The cathode separator may have an oxidant gas channel on the surface in contact with the cathode-side gas diffusion layer. In addition, the cathode separator may have a coolant channel for keeping the temperature of the fuel cell constant on the surface opposite to the surface in contact with the cathode-side gas diffusion layer.

The separator may be a gas-impermeable electroconductive member or the like. As the electroconductive member, for example, thermosetting resin, thermoplastic resin, resin material such as resin fiber, carbon powder, dense carbon that is made to be gas impermeable by compressing carbon material such as carbon fiber, and press-formed metal (for example, iron, aluminum, stainless steel, etc.) plate or the like may be used. In addition, the separator may have a current collecting function.

The shape of the separator may be a rectangle, a horizontally long hexagon, a horizontally long octagon, a circle, an oblong shape, and the like.

The fuel cell stack may have a manifold with which each hole communicates, such as a supply manifold with which each supply hole communicates and a discharge manifold with which each discharge hole communicates.

Examples of the supply manifold include a fuel gas supply manifold, an oxidant gas supply manifold, a coolant supply manifold, and the like.

Examples of the discharge manifold include a fuel gas discharge manifold, an oxidant gas discharge manifold, a coolant discharge manifold, and the like.

In the present disclosure, the fuel gas supply manifold and the oxidant gas supply manifold are collectively referred to as the reactant gas supply manifold.

In the present disclosure, the fuel gas discharge manifold and the oxidant gas discharge manifold are collectively referred to as the reactant gas discharge manifold.

In the present disclosure, the fuel gas supply manifold and the fuel gas discharge manifold are collectively referred to as the fuel gas manifold.

In the present disclosure, the oxidant gas supply manifold and the oxidant gas discharge manifold are collectively referred to as the oxidant gas manifold.

In the present disclosure, the fuel gas manifold and the oxidant gas manifold are collectively referred to as the reactant gas manifold.

In the present disclosure, the coolant supply manifold and the coolant discharge manifold are collectively referred to as the coolant manifold.

The seal sheet is disposed between the adjacent unit cells and used as a sealing member for the adjacent unit cells.

The seal sheet may be an adhesive sheet.

The seal sheet may be a thermoplastic resin such as a polyester-based thermoplastic resin and a modified olefin-based thermoplastic resin, or may be a thermosetting resin that is a modified epoxy resin.

The seal sheet may have a one-layer structure or a three-layer structure.

The three-layer structure may consist of a first sealing layer, an intermediate layer, and a second sealing layer.

The first sealing layer, the intermediate layer, and the second sealing layer may be made of the same material or may be made of different materials. The intermediate layer may be composed of a non-adhesive material.

The shape of the seal sheet may be a frame shape. The seal line frame of the seal sheet may be aligned with the seal line rib of the separator. The seal sheet may have a shape that covers the entire surface of the separator except for the holes in the separator. That is, the seal sheet may cover the entire surface of the separator except for the holes of the separator. The width of the frame that forms the seal line of the seal sheet may be the same as the width of the seal line rib of the separator, or may be greater than the width of the seal line rib of the separator.

The seal sheet may seal the surrounding portion of the holes so as to surround the holes forming the reactant gas manifold in plan view, or may seal the outer peripheral edge of the separator so as to surround all the holes. The reactant gas manifold referred to here may be a fuel gas manifold, may be an oxidant gas manifold, or may be both of these manifolds. In addition, the fuel gas manifold may be the fuel gas inlet manifold, may be the fuel gas outlet manifold, or may be both of these manifolds. Further, the oxidant gas manifold may be the oxidant gas inlet manifold, may be the oxidant gas outlet manifold, or may be both of these manifolds.

The seal sheet may seal the surrounding portion of the holes so as to surround the holes that form the fuel gas inlet manifold, the holes that form the fuel gas outlet manifold, the holes that form the oxidant gas inlet manifold, and the holes that form the oxidant gas outlet manifold, in plan view, and may seal the outer peripheral edge of the separator. The seal sheet may cover the entire surface of the separator except for the holes of the separator.

The separator may have ribs that form channels such as the reactant gas channel and the coolant channel.

The pair of separators has seal line ribs on the seal sheet side, which form a seal line with the seal sheet. The seal line ribs may be arranged so as to surround the holes such as the supply hole and the discharge hole when viewed in plan view, and may be arranged along the outer peripheral edge of the separator so as to surround all of these plurality of holes. In addition, the seal line ribs may be arranged in alignment with the seal lines of the seal sheet.

Among two facing separators that are a first facing separator and a second facing separator that face each other while sandwiching the seal sheet between the adjacent unit cells, the first facing separator that is one of the two facing separators includes a protruding portion on at least one part of the seal line rib, and the second facing separator that is the other one of the two facing separators has a recessed portion in the seal line rib that fits the protruding portion.

The protruding portion may be provided on at least a portion of the seal line rib, and may be provided on the entire periphery of the seal line rib.

The shape of the recessed portion is not particularly limited as long as it can fit the protruding portion, and may be linear, circular, spherical, or the like.

In the present disclosure, a crimped structure may be used as a method of stably taking a load applied to the seal line at a low load by using a seal sheet and suppressing misalignment due to the fitting structure of the recessed portion and the protruding portion.

When the recessed-protruding shape has a crimped structure, the thickness of the seal sheet and the F/S characteristics (stress-strain curve) may be taken into consideration, and the recessed-protruding shape may be designed so that the thickness of the seal sheet becomes uniform when it is pressed down from the lateral direction, for example.

FIG. 1 is a schematic plan view showing an example of the fuel cell stack of the present disclosure.

As shown in FIG. 1, the fuel cell stack of the present disclosure includes a fuel gas inlet manifold 30, a fuel gas outlet manifold 31, an oxidant gas inlet manifold 40, an oxidant gas outlet manifold 41, a coolant inlet manifold 50, and a coolant outlet manifold 51.

Seal line ribs 11 are arranged so as to surround the fuel gas inlet manifold 30, the fuel gas outlet manifold 31, the oxidant gas inlet manifold 40, the oxidant gas outlet manifold 41, and an outer peripheral edge of a separator 10.

FIG. 2 is a schematic cross-sectional view showing an example of a first facing separator and a second facing separator facing and sandwiching a seal sheet in a seal line between adjacent unit cells of the fuel cell stack of the present disclosure.

As shown in FIG. 2, among two facing separators that are a first facing separator 60 and a second facing separator 61, which face each other sandwiching a seal sheet 70, one of the two facing separators that is the first facing separator 60 includes a protruding portion 80 on the seal line rib. The second facing separator 61 that is the other one of the two facing separators has a recessed portion 90 that allows the protruding portion 80 to fit into the seal line rib.

FIG. 3 is a schematic perspective view showing an example of a recessed portion of the second facing separator. As shown in FIG. 3, the second facing separator 61 has a linear recessed portion 91 in the seal line rib 11, along the seal line of the seal line rib 11.

FIG. 4 is a schematic perspective view showing an example of the recessed portion of the second facing separator.

As shown in FIG. 4, the second facing separator 61 has a plurality of circular or spherical recessed portions 92 on the seal line rib 11.

What is claimed is:

1. A fuel cell stack comprising:
a cell stack in which a plurality of unit cells each including a pair of separators is stacked together; and
a seal sheet configured to seal between the unit cells that are adjacent to each other,
wherein the pair of separators each include a seal line rib on a seal sheet side of the separator, the seal line rib serving as a seal line with the seal sheet, and
wherein among two facing separators that are a first facing separator and a second facing separator facing each other while sandwiching the seal sheet between the unit cells that are adjacent to each other,
the first facing separator that is one of the two facing separators includes a protruding portion on at least one part of the seal line rib,
the second facing separator that is another one of the two facing separators includes a recessed portion in the seal line rib that is configured to fit the protruding portion; and
the seal sheet has a three-layer structure consisting of a first sealing layer, an intermediate layer, and a second sealing layer.

2. The fuel cell stack according to claim 1, wherein the seal sheet is an adhesive sheet.

3. The fuel cell stack according to claim 1, wherein the second facing separator includes a linear recessed portion in the seal line rib.

4. The fuel cell stack according to claim 1, wherein the second facing separator includes a plurality of circular or spherical recessed portions on the seal line rib.

5. The fuel cell stack according to claim 1, wherein the first sealing layer, the intermediate layer, and the second sealing layer are made of the same material.

6. The fuel cell stack according to claim 1, wherein the first sealing layer, the intermediate layer, and the second sealing layer are made of the different materials from each other.

7. The fuel cell stack according to claim 5, wherein the intermediate layer is composed of a non-adhesive material.

8. The fuel cell stack according to claim 6, wherein intermediate layer is composed of a non-adhesive material.

9. The fuel cell stack according to claim 1, wherein the seal sheet is a flat adhesive sheet having a uniform thickness and the protruding portion and recessed portion are configured to maintain alignment of the seal sheet during fastening of the cell stack.

10. The fuel cell stack according to claim 1, wherein the seal sheet is the only periphery seal sheet.

\* \* \* \* \*